(12) United States Patent
Tiirola et al.

(10) Patent No.: US 9,929,846 B2
(45) Date of Patent: Mar. 27, 2018

(54) ALLOCATION OF COMMUNICATION RESOURCES FOR CONTROL SIGNALS IN THE UPLINK

(75) Inventors: Esa Tapani Tiirola, Kempele (FI); Timo Erkki Lunttila, Espoo (FI); Kari Juhani Hooli, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/370,989

(22) PCT Filed: Jan. 9, 2012

(86) PCT No.: PCT/EP2012/050260
§ 371 (c)(1),
(2), (4) Date: Jul. 8, 2014

(87) PCT Pub. No.: WO2013/104411
PCT Pub. Date: Jul. 18, 2013

(65) Prior Publication Data
US 2015/0023264 A1    Jan. 22, 2015

(51) Int. Cl.
*H04W 4/00* (2009.01)
*H04L 5/00* (2006.01)
*H04W 72/04* (2009.01)
*H04L 1/18* (2006.01)

(52) U.S. Cl.
CPC .......... *H04L 5/0055* (2013.01); *H04L 1/1854* (2013.01); *H04L 5/0094* (2013.01); *H04W 72/042* (2013.01); *H04L 1/1812* (2013.01); *H04L 5/0007* (2013.01)

(58) Field of Classification Search
CPC ..................................................... H04L 5/0055
See application file for complete search history.

(56) References Cited

U.S. PATENT DOCUMENTS 9,503,239 B2 * 11/2016 Larsson ................ H04L 1/0039
2014/0301329 A1 * 10/2014 Kim ...................... H04L 1/1861
370/329

FOREIGN PATENT DOCUMENTS

| CN | 101568186 A | 10/2009 |
| CN | 102082647 A | 6/2011 |
| EP | 2 383 928 A2 | 11/2011 |

(Continued)

OTHER PUBLICATIONS

Alcatel-Lucent (PUCCH resource mapping with ePDCCH, R1-114066, Meeting #67, Nov. 14-18, 2011).*

(Continued)

*Primary Examiner* — Maharishi Khirodhar
(74) *Attorney, Agent, or Firm* — Harrington & Smith

(57) ABSTRACT

Apparatus, method, and computer program products relating to operations where information of at least one selected resource from a pool of resources for control signals in uplink is signaled in downlink. At least one resource is selected from a pool of resources for control signals in the uplink, where after information of the selected at least one resource is signaled in the downlink. Communication of control signals in the uplink by at least one device is facilitated such that at least one non-selected resource from the pool of resources is used in sending of control signals in the uplink. The at least one resource is implicitly derived in accordance with a predefined rule.

17 Claims, 3 Drawing Sheets

(56) References Cited

FOREIGN PATENT DOCUMENTS

KR    2010/00085132 A    7/2010
WO    WO 2013/062238    5/2013

OTHER PUBLICATIONS

3GPP TSG RAN WG1 Meeting #67, San Francisco, USA, Nov. 10-14, 2011, R1-113921, "Aspects on DL and UL Control channels for HARQ with Enhanced PDCCH", LG Electronics, 4 pgs.
3GPP TSG RAN WG1 Meeting #67, San Francisco, USA, Nov. 14-18, 2011, R1-114066, "PUCCH resource mapping with ePDCCH", Alcatel-Lucent Shanghai Bell, Alcatel-Lucent, 2 pgs.
LG Electronics *"PUCCH Resource Management for UL CoMP"* 3GPP TSG RAN WG1 Meeting #67 San Francisco, US Nov. 14-18, 2011. R1-113990.

* cited by examiner

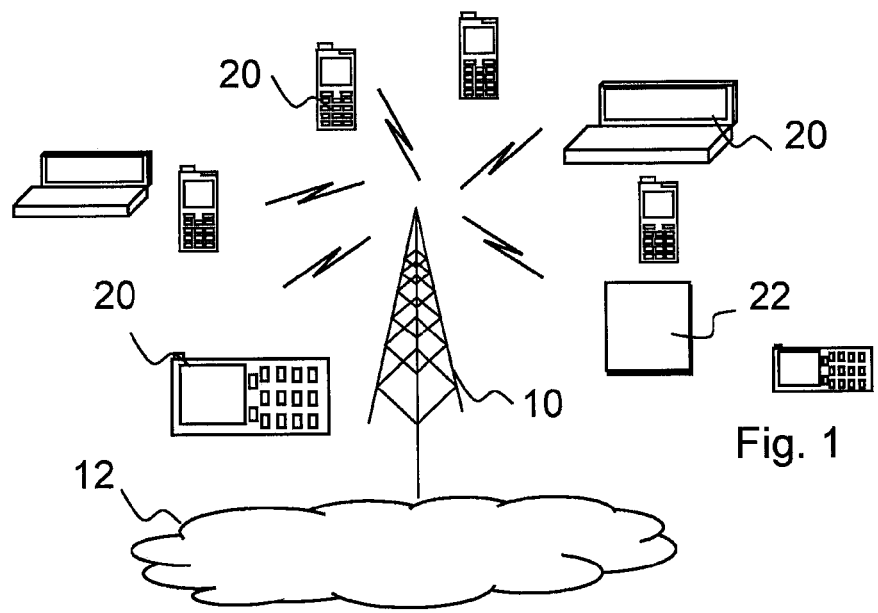
Fig. 1
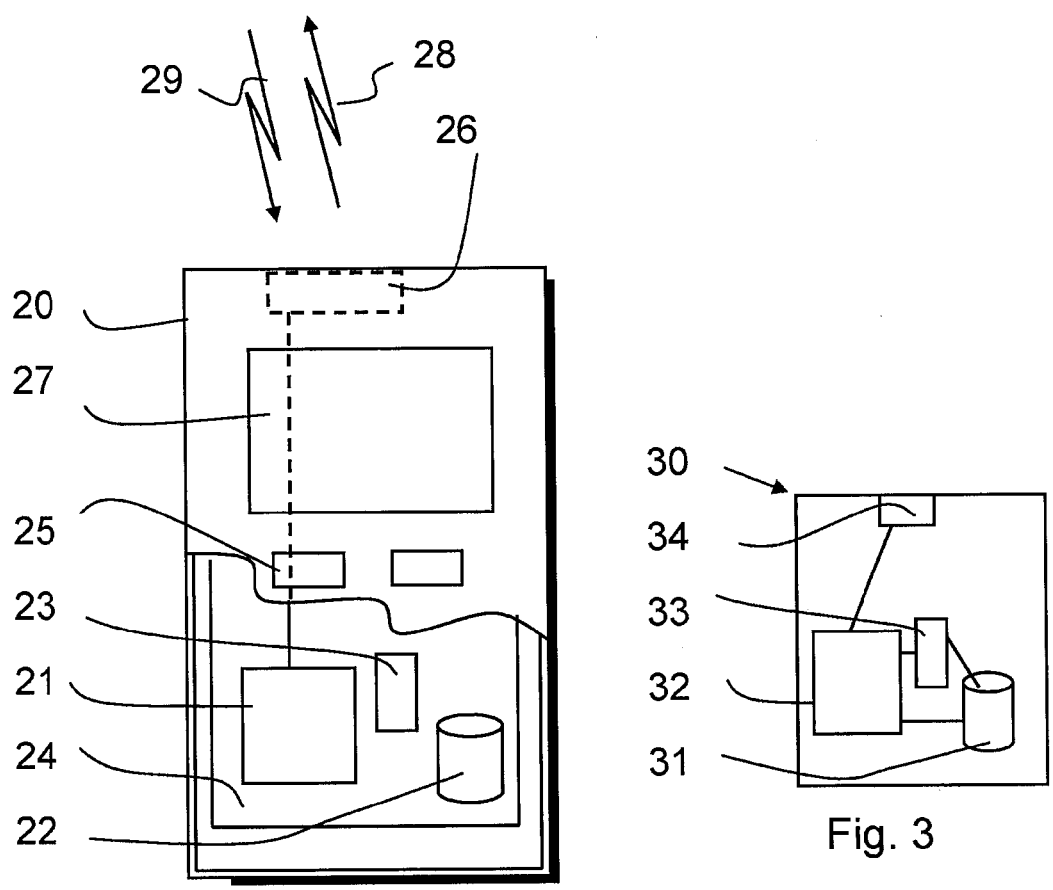
Fig. 2
Fig. 3

| PCFICH | 1.4MHz | 3 MHz | 5 MHz | 10 MHz | 15 MHz | 20 MHz |
|---|---|---|---|---|---|---|
| 1 | 0 | 2 | 3 | 8 | 12 | 17 |
| 2 | 2 | 7 | 12 | 25 | 37 | 50 |
| 3 | 4 | 12 | 20 | 41 | 62 | 84 |
| 4 | 6 | | | | | |

ALLOCATION OF COMMUNICATION RESOURCES FOR CONTROL SIGNALS IN THE UPLINK

This disclosure relates to allocation of resources for wireless communications and more particularly but not explicitly to allocation of resources for uplink control signals in a communication system.

A communication system can be seen as a facility that enables communication sessions between two or more nodes such as fixed or mobile devices, machine-type terminals, access nodes such as base stations, servers and so on. A communication system and compatible communicating entities typically operate in accordance with a given standard or specification which sets out what the various entities associated with the system are permitted to do and how that should be achieved. For example, the standards, specifications and related protocols can define the manner how devices shall communicate, how various aspects of communications shall be implemented and how devices for use in the system shall be configured.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a device such as a user equipment is used for enabling receiving and transmission of communications such as speech and content data.

Communications can be carried on wireless carriers. Examples of wireless systems include public land mobile networks (PLMN) such as cellular networks, satellite based communication systems and different wireless local networks, for example wireless local area networks (WLAN). In wireless systems a communication device provides a transceiver station that can communicate with another communication device such as e.g. a base station of an access network and/or another user equipment. The two directions of communications between a base station and communication devices of users have been conventionally referred to as downlink and uplink. Downlink (DL) can be understood as the direction from the base station to the communication device and uplink (UL) the direction from the communication device to the base station.

In certain systems allocation of resources for the downlink and the uplink are handled independently. Uplink (UL) assignments or grants sent to the user equipment (UE) are used to inform the user equipment of resources the UE shall use to transmit data. By means of the grants dynamic allocation of resources can be provided. Transmission of the scheduling information causes scheduling overhead.

Signalling of other types of control information is also needed. The control information may be communicated for example on physical uplink control channel (PUCCH). For example, signalling for the purposes of error detection and/or correction may be provided by means of such signalling. Requests for retransmission of any information that the recipient node did not successfully receive are possible. For example, hybrid automatic repeat request (HARQ) error control mechanism may be used for this purpose. The error control mechanism can be implemented such that a transmitting device shall receive either a positive or a negative acknowledgement (ACK/NACK; A/N) or other indication regarding its transmission from a receiving device.

An example of resource allocation for HARQ can be given in the context of a concept known as carrier aggregation (CA). In carrier aggregation more than one carrier can be used for communications between two devices. In CA, when physical control channel (PDCCH) is from a serving cell, a pool of N HARQ-ACK resources are defined for user equipment (UE) and one of these resources is selected by a controlling network element to carry ACK/NACK payload. Information of all N resources in the pool is explicitly signalled via radio resource control (RRC) to the user equipment.

Increased utilization of advanced systems for various scenarios and different data traffic types increases the need to optimize the system further for a large number of users. A way to achieve this is to improve scheduling efficiency. In particular, reduction in scheduling overhead may be desired.

It might be desired in certain applications to reduce downlink control signalling overhead caused by uplink and downlink scheduling. Optimization of signalling on physical downlink control channel (PDCCH) could be of particular advantage.

It is noted that the above discussed issues are not limited to any particular communication environment and station apparatus, but may occur in any appropriate station apparatus where internal communications are required.

Embodiments of the invention aim to address one or several of the above issues.

In accordance with an embodiment there is provided an apparatus for a network element, the apparatus comprising at least one processor, and at least one memory including computer program code, wherein the at least one memory and the computer program code are configured, with the at least one processor, to select at least one resource from a pool of resources for control signals in the uplink, cause signalling of information of the selected at least one resource in the downlink, and facilitate communication of control signals in the uplink by at least one device based on at least one non-selected resource from the pool of resources, wherein the at least one resource is implicitly derived in accordance with a predefined rule.

According to another aspect, there is provided an apparatus for a communication device for enabling operation thereof in a system where information of at least one selected resource from a pool of resources for control signals in the uplink is signalled in the downlink, the apparatus comprising at least one processor, and at least one memory including computer program code, wherein the at least one memory and the computer program code are configured, with the at least one processor, to implicitly derive at least one non-selected resource from the pool of resources for control signals in the uplink in accordance with a predefined rule, and cause sending of control signals in the uplink on the derived at least one non-selected resource.

According to another aspect, there is provided a method for controlling communications, comprising selecting at least one resource from a pool of resources for control signals in the uplink, signalling information of the selected at least one resource in the downlink, and facilitating communication of control signals in the uplink by at least one device based on at least one non-selected resource from the pool of resources, wherein the at least one resource is implicitly derived in accordance with a predefined rule.

According to yet another aspect, there is provided a method for enabling operation of a communication device in a communication system where information of at least one resource selected from a pool of resources for control signals in the uplink is signalled in the downlink, the method comprising implicitly deriving at least one non-selected resource from the pool of resources for control signals in the uplink in accordance with a predefined rule, and sending of control signals in the uplink on the derived at least one non-selected resource.

According to a more detailed aspect, signalling of error correction function messages in a physical uplink control channel is enabled by means of the at least one non-selected resource.

Messages may be signalled in a physical uplink control channel by means of the at least one non-selected resource, the resource being determined based on an enhanced physical downlink control channel.

At least first and second devices may communicate in the uplink. The first devices may be configured for a physical downlink control channel and to signal control signals in the selected resources and the second devices may be configured for an enhanced physical downlink control channel and to signal control signals in the non-selected resources. Different uplink resources may be allocated for the first and second devices based on an offset parameter.

At least some information for deriving the non-selected resources may be derived based on information of the selected resources.

In accordance with a detailed embodiment a pool of resources may be defined for uplink hybrid automatic repeat request messages, each resource having an index. At least one of the resources may be selected dynamically and information about the index or indexes of the dynamically selected resource may be conveyed on an enhanced physical downlink control channel. The at least one non-selected resource can then be derived based on the index information and an offset. Said index information may be signalled by means of a transmit power control message.

At least one non-selected resource may be derived implicitly based on at least one parameter associated with an enhanced physical downlink control channel, physical downlink shared channel and/or a communication device.

A common implicit rule may be used or all channels. A dynamic modifier may be used for distinguishing different uses.

A node such as a base station or a communication device of a user of machine type terminal can be configured to operate in accordance with the various embodiments.

A computer program comprising program code means adapted to perform the method may also be provided. The computer program may be stored and/or otherwise embodied by means of a carrier medium.

It should be appreciated that any feature of any aspect may be combined with any other feature of any other aspect.

Embodiments will now be described in further detail, by way of example only, with reference to the following examples and accompanying drawings, in which:

FIG. 1 shows a schematic diagram of a communication system comprising a base station and a plurality of communication devices;

FIG. 2 shows a schematic diagram of a mobile communication device according to some embodiments;

FIG. 3 shows a schematic diagram of a control apparatus according to some embodiments;

Figures 4, 6:
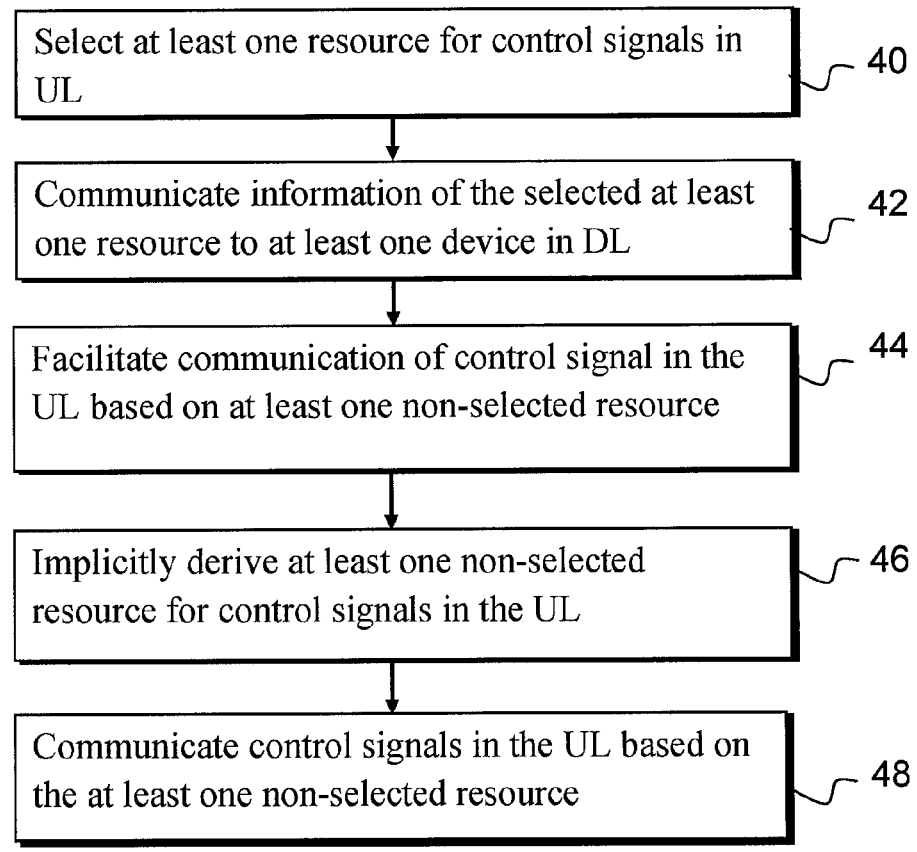
FIG. 4 shows a flowchart according to an embodiment.
FIG. 6 shows use of resources with different parameters.

In the following certain exemplifying embodiments are explained with reference to a wireless or mobile communication system serving mobile communication devices. Before explaining in detail the exemplifying embodiments, certain general principles of a wireless communication system, access systems thereof, and mobile communication devices are briefly explained with reference to FIGS. 1 to 3 to assist in understanding the technology underlying the described examples.

An example of wireless communication systems are architectures standardized by the 3rd Generation Partnership Project (3GPP). A latest 3GPP based development is often referred to as the long-term evolution (LTE) of the Universal Mobile Telecommunications System (UMTS) radio-access technology. The various development stages of the 3GPP LTE specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

A device capable of wireless communications can communicate via at least one base station or similar wireless transmitter and/or receiver node. In FIG. 1 a base station is shown to be serving various mobile devices 20 and a machine-like terminal 22. Base stations are typically controlled by at least one appropriate controller apparatus so as to enable operation thereof and management of mobile communication devices in communication with the base stations. The base station can be connected further to a broader communications system 12. It shall be understood that a number of neighbouring and/or overlapping access systems or radio service areas provided by a number of base stations may exist. A base station site can provide one or more cells or sectors, each sector providing a cell or a subarea of a cell. Each device and base station may have one or more radio channels open at the same time and may send signals to and/or receive signals from one or more sources. As a plurality of devices can use the same wireless resource, transmissions thereof need to be scheduled to avoid collisions and/or interference.

A possible mobile communication device for transmitting in uplink and receiving in downlink will now be described in more detail with reference to FIG. 2 showing a schematic, partially sectioned view of a communication device 20. Such a communication device is often referred to as user equipment (UE) or terminal. An appropriate communication device may be provided by any device capable of sending radio signals to and/or receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Non-limiting examples of content data include downloads, television and radio programs, videos, advertisements, various alerts and other information.

The device 20 is configured to receive signals in the downlink 29 over an air interface via appropriate apparatus for receiving and to transmit signals in the uplink 28 via appropriate apparatus for transmitting radio signals. In FIG. 2 the transceiver apparatus is designated schematically by block 26. The transceiver apparatus 26 may be provided for example by means of a radio part and associated antenna arrangement. The antenna arrangement may be arranged internally or externally to the mobile device.

A mobile communication device is also provided with at least one data processing entity 21, at least one memory 22 and other possible components 23 for use in software and hardware aided execution of tasks it is designed to perform, including control of access to and communications with base stations and/or other communication devices. The data processing, storage and other relevant apparatus can be provided on an appropriate circuit board and/or in chipsets. This apparatus is denoted by reference 24.

The user may control the operation of the mobile device by means of a suitable user interface such as key pad 25, voice commands, touch sensitive screen or pad, combinations thereof or the like. A display 27, a speaker and a microphone can be also provided. Furthermore, a communication device may comprise appropriate connectors (either wired or wireless) to other devices and/or for connecting external accessories, for example hands-free equipment, thereto.

FIG. 3 shows an example of a control apparatus 30 for a communication system, for example to be coupled to and/or for controlling a base station. In some embodiments a base station may comprise an integrated control apparatus and some other embodiments the control apparatus can be provided by a separate network element. The control apparatus can be interconnected with other control entities. The control apparatus and functions may be distributed between a plurality of control units. In some embodiments each base station can comprise a control apparatus. In alternative embodiments, two or more base stations may share a control apparatus. The arrangement of the control depends on the standard, and for example in accordance with the current LTE specifications no separate radio network controller is provided. Regardless the location, the control apparatus 30 can be understood as providing control on communications in the service area of at least one base station. The control apparatus 30 can be configured to provide control functions in association with scheduling of uplink in accordance with embodiments described below. For this purpose the control apparatus can comprise at least one memory 31, at least one data processing unit 32, 33 and an input/output interface 34. Via the interface the control apparatus can be coupled to a base station to cause operation of the base station in accordance with the below described embodiments. The control apparatus can be configured to execute an appropriate software code to provide the control functions.

A wireless communication device, such as a mobile device, machine-like terminal or a base station, can be provided with a Multiple Input/Multiple Output (MIMO) antenna system. MIMO arrangements as such are known. MIMO systems use multiple antennas at the transmitter and receiver along with advanced digital signal processing to improve link quality and capacity. For example, the transceiver apparatus 26 of FIG. 2 can provide a plurality of antenna ports. More data can be received and/or sent where there are more antennae elements.

Certain embodiments will now be described in more detail. In the method illustrated by the flowchart of FIG. 4 a network element selects at 40 at least one resource from a pool of resources for control signals in the uplink. This resource selection can be provided dynamically. Information of the selected at least one resource is signalled at 42 in the downlink. At 44 the network element can facilitate communication of control signals in the uplink by at least one device based on at least one non-selected resource in the pool of resources. The non-selected resource is implicitly derived based on a predefined rule.

According to a possibility the information of the resources can be signalled to a plurality of devices comprising at least two different devices, or devices operating in different modes. First devices can be enabled to operate based on a control channel such as a physical downlink control channel (PDCCH) and second devices can be enabled operate based on another or additional control channel, such as an enhanced physical downlink control channel (ePDCCH). Devices in the PDCCH mode can be referred as devices in "legacy mode". Switching between the modes may be provided. For example, some devices can use ePDCCH and/or PDCCH depending on the transmission mode.

Signalling of the information may be carried out separately to different devices. A device may not be aware of resources selected for other devices.

At step 46 a communication device receiving the information can implicitly derive at least one non-selected resource for control signals in the uplink in accordance with the predefined rule. The device can then use this non-selected resource for sending of control signals at 48 in the uplink. In the case of the two groups mentioned above, the devices of the second group could be configured to use the non-selected resources.

In the following certain more detailed examples in relation to use of physical uplink control channel (PUCCH) resources are described. In accordance with an embodiment evolved physical downlink control channel (ePDCCH) is used for scheduling a physical downlink shared channel (PDCCH). ePDCCH is a recent development of the LTE and is designed to improve control channel performance. ePDCCH may be in particular useful in connection with arrangements such as coordinated multipoint (CoMP), DL MIMO, heterogeneous networks (HetNet) and carrier aggregation, including use of extension carriers. For example, ePDCCH may be used to provide support for increased control channel capacity, support for frequency-domain interference control and interference coordination (ICIC), improved spatial reuse of control channel resources, support for beamforming and/or diversity, support for operation on new carrier types and in Multicast Broadcast Single Frequency Network (MB-SFN) subframes, capability to coexist on the same carrier as legacy user equipment, ability to be scheduled frequency-selectively, ability to mitigate inter-cell interference and so on.

In accordance with an embodiment resource allocation can be provided such that implicit and explicit resource allocation are combined with certain rules how to derive the non-explicitly allocated resources. A part or even all of a pool of N resources are not explicitly selected and conveyed by means of a DL control channel but are implicitly derived for communication of control signals in the uplink. For example, allocation of a PUCCH resource can be derived where ePDCCH is used for scheduling based on combination of implicit allocation (e.g. rule related to an ePDCCH resource and/or PDSCH resource subject to ePDCCH scheduling) and explicit allocation (e.g. certain control bits in the ePDCCH). The implicit allocation can thus be derived based on a predefined set of rules related to the ePDCCH and the content thereof. The implicit part can be supported by explicit part in different manners, as will be explained below in the context of the more detailed embodiments.

In view of the term "pool" as used herein it is noted there can be many more than N resources in a resource pool that are available but only one out of N of them may be available to be selected dynamically. For example, a eNodeB can "preselect/configure" semi-statically N (the number of resources that can be dynamically indicated via ePDCCH) of the resources in the pool of available M resources and then dynamically select one of the pool of N preselected resources. The number M of resources in the pool of resources is typically considerably larger than N. For example, N can be e.g. 4 while the total number of ACK/NACK resource in the pool can be around 100 or more.

The pool of resources may consist of PUCCH Format 1/1a/1b resources or other available in current cell. The resource pool may consist of dynamic and semi-static parts. Dynamic part may be reserved for control signalling, e.g. HARQ-ACK signalling that relates to PDSCH and is scheduled via PDSCH. Semi-static part may be reserved for scheduling request and HARQ-ACK corresponding to semi-persistently scheduled PDSCH.

Only a part of resources in a resource pool can be selected for use in certain subframe, these resources being called herein as selected resources. Examples of this usage include uplink HARQ-ACK signalling related to PDSCH and scheduled via PDCCH. This usage may also include HARQ-ACK resources that relate to semi-persistently scheduled PDSCH and other existing use cases, including scheduling requests using PUCCH Format 1.

Another part of the resource pool is not used by legacy mode devices. These resources can be referred to as non-selected resources. The unused part of the resource pool can be utilised such that at least some of non-selected resource can be used for uplink signalling. This usage includes uplink control signaling related to PDSCH and scheduled via ePDCCH, as will be explained in more detail below.

The following example is given with reference to error correction mechanism based on ACK/NACK messages. When ePDCCH is used to schedule downlink data on physical downlink shared channel (PDSCH) one or more uplink control channel resources for HARQ-ACK transmitted on the physical uplink control channel (PUCCH) are needed by communication devices in order to be able to respond to the received PDSCH. There can be various aspects that need to be taken into account when designing relevant uplink control channel for an ePDCCH. For example, backwards compatibility with devices scheduled with PDCCH can be of importance. It is anticipated that HARQ-ACK corresponding to PDSCH scheduled via ePDCCH is able to utilize at least partly existing PUCCH format 1a/1b resources currently used for PDSCH ACK/NACKs for devices in a legacy mode (e.g. current LTE capable user equipment scheduled with PDCCH). Scheduling restrictions for devices in a legacy mode due to potential collision of HARQ-ACK resources should be avoided whilst PUCCH overhead should be kept in its minimum. ePDCCH can provide capacity enhancement solution for dynamic resource allocation, an advantage that is believed to result a greater number of devices being configured to support ePDCCH. The numbers can be considerable and thus an aim is to optimise use of existing PUCCH overhead. ePDCCH overhead may also need to be optimised due to HARQ-ACK resource allocation included in downlink control information (DCI) formats carried via ePDCCH. Certain embodiments also aim to ease scheduling restrictions due to simultaneous scheduled devices utilizing either PDCCH or ePDCCH.

In accordance with an embodiment N HARQ-ACK resources are defined. This can be provided by a network element such as an eNB. The eNB can then select any of the N HARQ-ACK resources in current subframe for the HARQ-ACK signalling scheduled via ePDCCH. Thus some of the resources may be "selected resources". Information about the selection is communicated via explicit or implicit signalling in downlink control information (DCI). At least part of the N HARQ-ACK resources are "non-selected", i.e., available for ePDCCH enabled devices such that at least one out of N HARQ-ACK resources is derived implicitly in accordance with a predefined rule.

According to an embodiment at least one out of N resources can be selected dynamically based on pre-defined bits/codepoints conveyed via ePDCCH. An example of this is the 2-bit uplink transmit power control field. Bits specific for this purpose may also be introduced. An index of the selected resource can be signalled via ePDCCH and can be denoted as n (n {1, 2, . . . N}. At least one out of N HARQ-ACK resources can then be derived implicitly based on the index and a predefined rule related to the ePDCCH, PDSCH and/or a user equipment and/or cell specific parameter or parameters.

In accordance with an embodiment, only one HARQ-ACK resource is derived implicitly based on information from the network. Other (N−1) resources can then be derived from information regarding the implicitly derived channel according to a predetermined rule. For example, the other resources can be derived based on a fixed/predefined offset from the implicitly derived resource. An example of this is where a common implicit rule for all (N) HARQ-ACK resources is used. Dynamic allocation can be used here as a modifier on top of the implicit resource allocation, e.g. as a fixed/predefined offset with regard to the implicit resource. The predefined modifier can be used to modify a result given by the implicit rule in differential manner. Thus a final result is given by the implicit rule+a delta derived from ePDCCH. The delta can be e.g., [0, +1, −1, +2].

In another embodiment, k out of N (k>0) HARQ-ACK resources are derived implicitly whereas the other (N−k) resources are configured explicitly by means of RRC signalling. The k implicit resources may have either common or separate implicit rule.

In yet another embodiment all (N) HARQ-ACK resources are derived implicitly according to separate resource allocation rules. This approach is based on the assumption that statistically at least one out of N resources can be considered as being free from collision. Pseudo-random rules are provided such that N different resource opportunities are randomly (or evenly) distributed over the allowed resource space.

Various combinations of the above schemes are also possible. For example, some the implicit resources may have a common rule whereas some of the resources may have a rule of their own.

Thus some of the HARQ-ACK resources can be implicitly derived from ePDCCH and/or PDSCH and/or another from a resource allocated using ePDDCH. In accordance with an example, one of the N HARQ-ACK resources is selected and communicated via explicit signalling in downlink control information (DCI). Some of the resources can be explicitly configured via the RRC. Some other HARQ resources may also be derived based on information about implicit resources. In accordance with a possibility all resources are implicitly derived with a common rule, but with a different dynamic part of the signalling.

In accordance with a specific embodiment a new parameter is defined for PUCCH channelization. The parameter is denoted herein as $o_{ePDCCH}^{dynamic}$ and may contain N separate values:

$$(O_{ePDCCH}^{dynamic} \in \lfloor O_{ePDCCH}^1 \ O_{ePDCCH}^2 \ \ldots \ O_{ePDCCH}^N \rfloor)$$

The value to be applied for resource allocation can be selected dynamically via pre-defined log 2(N) bits or N codepoints conveyed via ePDCCH.

At least one of the entries of the parameter $o_{ePDCCH}^{dynamic}$ can relate to an implicitly allocated HARQ-ACK resource. The applied PUCCH HARQ-ACK resource, $n_{PUCCH}^{(1)ePDCCH}$, can be defined by means of an offset with respect to known reference according to the following equation:

$$n_{PUCCH}^{(1)ePDCCH} = N_{PUCCH}^{(1)} + o_{ePDCCH}^{dynamic}(n),$$

where $o_{ePDCCH}^{dynamic}(n)$ is the offset parameter (in which at least one value is derived implicitly based on the scheduling ePDCCH and/or PDSCH), n is the index of the dynamic part, and $N_{PUCCH}^{(1)}$ corresponds to the number of resources reserved for persistent HARQ-ACK and scheduling request.

It is noted that an offset may not be necessary with explicitly configured (i.e. constant, independent of ePDCCH scheduling) entries of these entries can relate directly to a RRC-configured resource.

Figure 5:
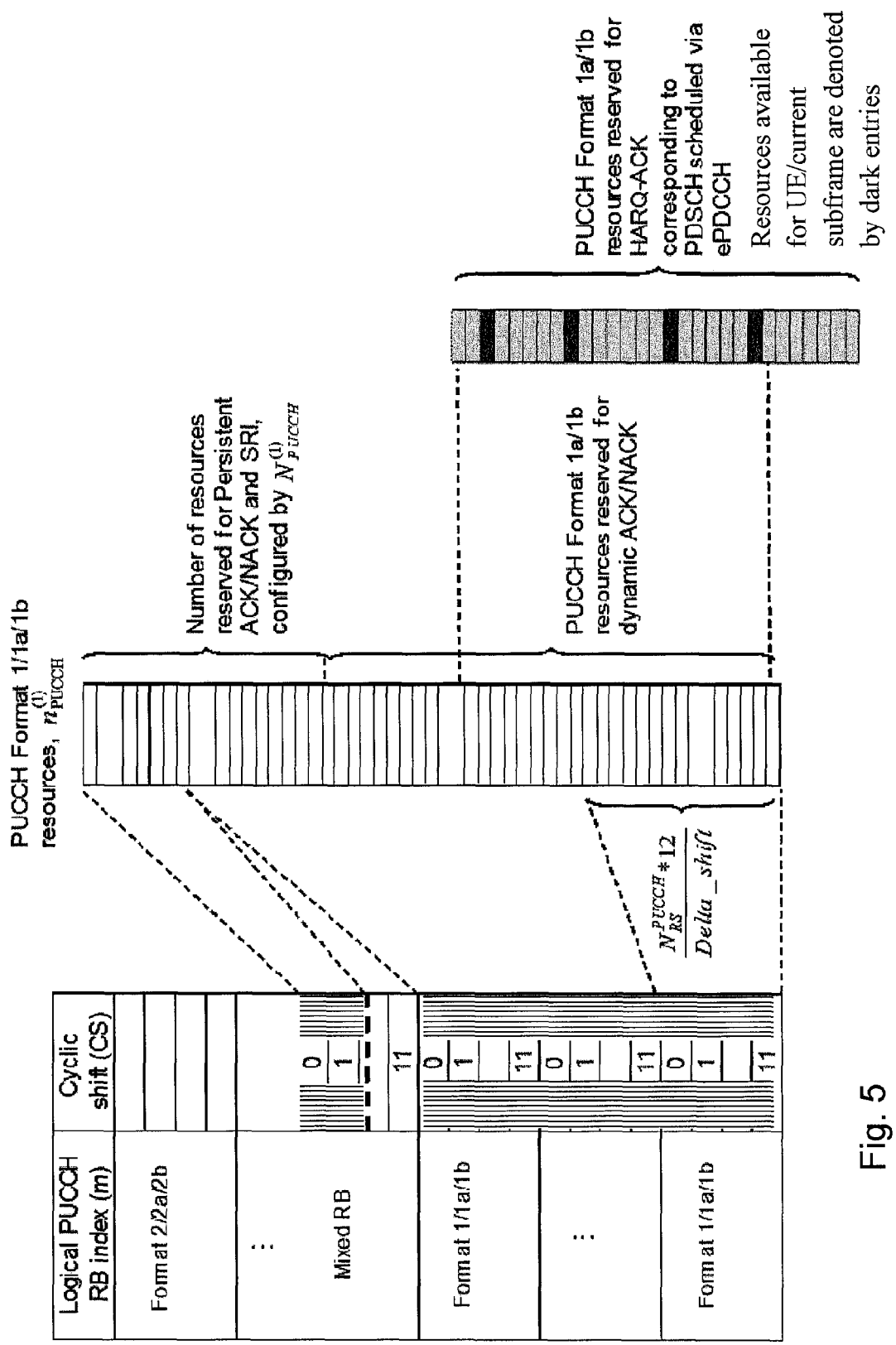
FIG. 5 shows a PUCCH structure in accordance with an embodiment.

It is also possible to have a fixed offset between dynamic A/N resources of UEs in a legacy mode (i.e when PDCCH is used) and dynamic resources A/N of ePDCCH UEs as shown in FIG. 5. This can be realized by means of additional semi-static parameter, $o_{ePDCCH}^{semi-static}$. This parameter can be either cell-specific or UE-specific. The applied HARQ-ACK resource can be defined in this case according to the following equation:

$$n_{PUCCH}^{(1)ePDCCH} = N_{PUCCH}^{(1)} + o_{ePDCCH}^{dynamic}(n) + o_{ePDCCH}^{semi-static}.$$

A benefit of this approach is that it allows to trade-off the scheduler flexibility and PUCCH overhead.

Limitation in the total of control signal resources for ePDCCH may be provided, this enabling a trade-off between PUCCH overhead and scheduler flexibility. In one embodiment an eNB can adjust the range of values for the parameter $o_{ePDCCH}^{dynamic}$ in order to further trade-off the PUCCH overhead and scheduler flexibility. The maximum (and/or minimum) value of $o_{ePDCCH}^{dynamic}$ can be limited into a predefined value $o_{ePDCCH}^{MAX}$. This can be realized e.g. by means of modulo operation mod ($o_{ePDCCH}^{dynamic}$, $o_{ePDCCH}^{MAX}$). The range can be configured e.g., by means of RRC. It is also possible to derive the range according to the instantaneous/maximum applied physical control format indicator channel (PCFICH) value.

FIG. 5 shows an example of current PUCCH structure emphasizing the Format 1a/1b resources reserved for dynamic HARQ-ACK. This figure assumes the following parameterization for HARQ-ACK resources corresponding to PDSCH scheduled via ePDCCH:

$o_{ePDCCH}^{semi-static} = 10$
$o_{ePDCCH}^{MAX} = 29$
mod($o_{ePDCCH}^{dynamic}$, $o_{ePDCCH}^{MAX}$)∈{3,9,16,22}.

The amount of resources that are implicitly and explicitly allocated can be variable. The variation can be provided within limits where at least one out of a given number of resources can be allocated explicitly and at least one resource can be allocated implicitly.

Use of implicit resource allocation and dynamic or explicit resource allocation for HARQ-ACK messages corresponding to PDSCH scheduled via ePDCCH can provide efficient resource utilization with existing dynamic A/N space. Also, HARQ-ACK space can be made scalable. Utilization of the same resource pool for PUCCH HARQ ACK/NACKs (A/N) for devices in a legacy mode and ePDCCH capable devices may be enabled. This is so because dynamic A/N space can be better utilized while at the same time the HARQ-ACK space can be scalable. Otherwise a separate pool would be needed in order not to collide A/Ns of devise in a legacy mode and ePDCCH capable devices.

At least some of the uplink resources can be scheduled based on implicit information because the explicit dynamic allocation is not likely to allocate the entire available uplink resource. This is illustrated by FIG. 6 showing a table giving the number of control channel element (CCE) resources with different bandwidth options (1.4-20 MHz) and different control channel values allocated for PDCCH. More particularly, the table shows the number of CCE resources used for Physical Control Format Indicator Channel (PCFICH) values 1 to 4. LTE Release 8 provides one-to-one mapping between the CCE and HARQ-ACK resources reserved for dynamically scheduled PDSCH, and hence, the number of CCEs shown in FIG. 6 also represents the number of HARQ-ACK resources. It can be noted that HARQ-ACK resulting from a dynamically scheduled PDSCH can represent significant overhead in UL side keeping in mind that in a typical configuration, one physical resource block (PRB) corresponds to 18 HARQ-ACK resources. Furthermore, in capacity limited case the PCFICH value is likely to be 3, thus reserving a considerable amount of resources. On the other hand, the inventors have recognised that in practice only a fraction of the dynamic HARQ-ACK resources are actually used. This can be so because a part of the CCEs are reserved for DCI format 0/3/3A/4, these being uplink (0 and 4) and power control grants (3/3A) which do not even trigger HARQ-ACK in the uplink. Furthermore, in a typical case PDCCH for a given user equipment consists of more than one control channel element (CCE) resource to facilitate link adaptation, the average number in macro environment being about 2.5 CCEs/PDCCH. An outcome of this is that less than ⅓ of the resources reserved for dynamic HARQ-ACK may actually be used on average. Therefore a reasonable amount of unused resources are believed to be available for the implicit allocation as discussed above.

The embodiments may save PUCCH resources and this way more PRBs may be used for PUSCH. Thus control channel overhead may be decreased. Combination of explicit and implicit allocation of resources may be used to allow a better utilization of existing error correction messaging space and/or for a better scalability in general.

The above described principles may also be used in connection with carrier aggregation and/or time division duplexing (TDD). In these cases, multiple HARQ-ACKs can be signalled e.g. by using PUCCH format 1b with channel selection. For the HARQ-ACK signalling, multiple PUCCH resources from the N resources can be selected dynamically. Also in this case, amount of implicitly and explicitly allocated resources may vary.

It is noted that whilst embodiments have been described in relation to LTE, similar principles can be applied to any other communication system or to further developments with LTE. Also, instead of scheduling that is provided by a control apparatus associated with a base station scheduling may be provided by any apparatus for scheduling transmissions in two directions between at least two devices. Thus, although the embodiments are described with references to uplink and downlink, this disclosure is not limited by these directions between a base station and a user terminal. Instead, the invention is applicable to any system where a control apparatus can schedule transmissions between two or more communicating entities, wherein the scheduling entity can be seen as being in the "upper" end of the link. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

The required data processing apparatus and functions of a base station apparatus, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. An apparatus comprising at least one processor, and at least one memory including computer program code, wherein the at least one memory and the computer program code are configured, with the at least one processor, to perform or control at least the following:
   select at least one resource from a pool of resources for control signals in an uplink;
   cause signaling of information of the selected at least one resource in a downlink; and
   facilitate communication of control signals in the uplink by at least one device based on at least one non-selected resource from the pool of resources,
      wherein the at least one resource is implicitly derived in accordance with a predefined rule,
      wherein at least some information needed to derive the non-selected resources is derived based on information of the selected resources, and
      wherein at least first and second devices communicate in the uplink, the first devices being configured for a physical downlink control channel and to signal control signals in the selected resources and the second devices being configured for an enhanced physical downlink control channel and to signal control signals in the non-selected resources.

2. The apparatus of claim 1, wherein the at least one memory and the computer program code are further configured, with the at least one processor, to perform or control at least the following:
   enable signaling of error correction function messages in a physical uplink control channel by means of the at least one non-selected resource.

3. The apparatus of claim 1, wherein the at least one memory and the computer program code are further configured, with the at least one processor, to perform or control at least the following:
   enable signaling of messages in a physical uplink control channel by means of the at least one non-selected resource determined based on an enhanced physical downlink control channel.

4. The apparatus of claim 1, wherein at least first and second devices communicate in the uplink, the first devices being configured for a physical downlink control channel and to signal control signals in the selected resources and the second devices being configured for an enhanced physical downlink control channel and to signal control signals in the non-selected resources.

5. The apparatus of claim 1, wherein the at least one memory and the computer program code are further configured, with the at least one processor, to perform or control at least the following:
   allocate different uplink resources for the first and second devices based on an offset parameter.

6. The apparatus of claim 1, wherein the at least one memory and the computer program code are further configured, with the at least one processor, to perform or control at least the following:

define a pool of resources for uplink hybrid automatic repeat request messages, each resource having an index;
select dynamically at least one of the resources;
convey information about the index or indexes of the dynamically selected resource on an enhanced physical downlink control channel; and
derive the at least one non-selected resource based on the index information and an offset.

7. The apparatus of claim 1, wherein at least one non-selected resource is derived implicitly based on at least one parameter associated with an enhanced physical downlink control channel, physical downlink shared channel and/or a communication device.

8. An apparatus comprising at least one processor, and at least one memory including computer program code, wherein the at least one memory and the computer program code are configured, with the at least one processor, to perform or control at least the following:
implicitly derive, in a communication system where information of at least one selected resource from a pool of resources for control signals in an uplink has been signaled in a downlink, at least one non-selected resource from the pool of resources for control signals in the uplink in accordance with a predefined rule, wherein at least some information needed to derive the non-selected resources is derived based on information of the selected resources; and
cause sending of control signals in the uplink on the derived at least one non-selected resource, wherein at least first and second devices communicate in the uplink, the first devices being configured for a physical downlink control channel and to signal control signals in the selected resources and the second devices being configured for an enhanced physical downlink control channel and to signal control signals in the non-selected resources.

9. A method comprising:
selecting at least one resource from a pool of resources for control signals in an uplink;
signaling information of the selected at least one resource in a downlink; and
facilitating communication of control signals in the uplink by at least one device based on at least one non-selected resource from the pool of resources,
wherein the at least one resource is implicitly derived in accordance with a predefined rule,
wherein at least some information needed to derive the non-selected resources is derived based on information of the selected resources, and
wherein at least first and second devices communicate in the uplink, the first devices being configured for a physical downlink control channel and to signal control signals in the selected resources and the second devices being configured for an enhanced physical downlink control channel and to signal control signals in the non-selected resources.

10. The method of claim 9, comprising deriving the at least one non-selected resource based on an enhanced physical downlink control channel.

11. The method of claim 9, wherein the pool of resources comprises resources reserved for dynamic hybrid automatic repeat request messages in the uplink responsive to data in a shared channel in the downlink.

12. The method of claim 9, comprising separating uplink resources for the first and second devices based on an offset parameter.

13. The method of claim 9, further comprising using a common implicit rule for all channels and a dynamic modifier.

14. A method comprising
implicitly deriving, by a communication device in a communication system where information of at least one resource selected from a pool of resources for control signals in an uplink has been signaled in a downlink, at least one non-selected resource from the pool of resources for control signals in the uplink in accordance with a predefined rule, wherein at least some information needed to derive the non-selected resources is derived based on information of the selected resources; and
sending of control signals in the uplink on the derived at least one non-selected resource, wherein at least first and second devices communicate in the uplink, the first devices being configured for a physical downlink control channel and to signal control signals in the selected resources and the second devices being configured for an enhanced physical downlink control channel and to signal control signals in the non-selected resources.

15. The method of claim 9, comprising signaling of automatic repeat request messages in a physical uplink control channel on the at least one non-selected resource.

16. A computer program product embodied on a non-transitory computer-readable medium in which a computer program is stored that, when being executed by a computer, is configured to provide instructions to control or carry out the following:
selecting at least one resource from a pool of resources for control signals in an uplink;
signaling information of the selected at least one resource in a downlink; and
facilitating communication of control signals in the uplink by at least one device based on at least one non-selected resource from the pool of resources,
wherein the at least one resource is implicitly derived in accordance with a predefined rule,
wherein at least some information needed to derive the non-selected resources is derived based on information of the selected resources, and
wherein at least first and second devices communicate in the uplink, the first devices being configured for a physical downlink control channel and to signal control signals in the selected resources and the second devices being configured for an enhanced physical downlink control channel and to signal control signals in the non-selected resources.

17. A computer program product embodied on a non-transitory computer-readable medium in which a computer program is stored that, when being executed by a computer, is configured to provide instructions to control or carry out the following:
implicitly deriving, by a communication device in a communication system where information of at least one resource selected from a pool of resources for control signals in an uplink has been signaled in a downlink, at least one non-selected resource from the pool of resources for control signals in the uplink in accordance with a predefined rule, wherein at least some information needed to derive the non-selected resources is derived based on information of the selected resources; and
sending of control signals in the uplink on the derived at least one non-selected resource, wherein at least first and second devices communicate in the uplink, the first devices being configured for a physical downlink control channel and to signal control signals in the selected resources and the second devices being configured for an enhanced physical downlink control channel and to signal control signals in the non-selected resources.

\* \* \* \* \*